UNITED STATES PATENT OFFICE.

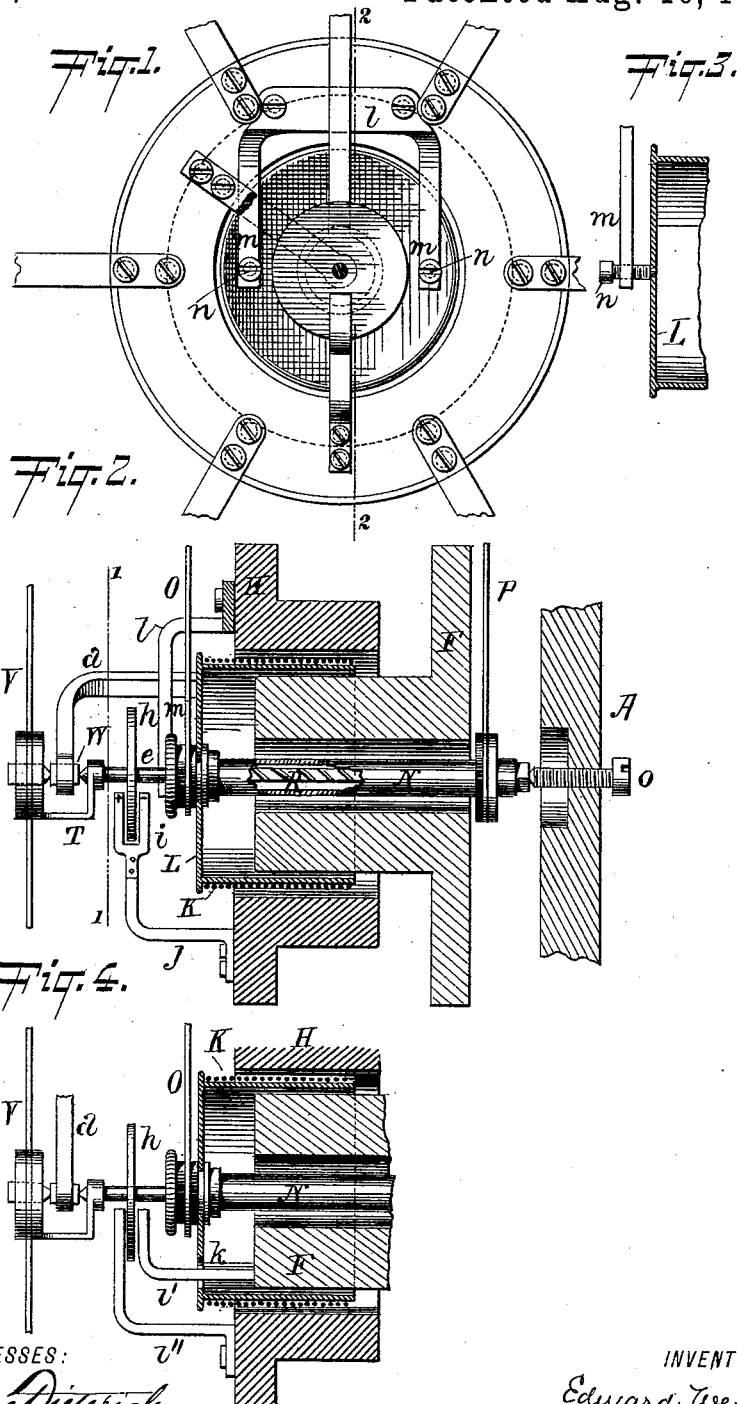

EDWARD WESTON, OF NEWARK, NEW JERSEY.

ELECTRICAL MEASURING-INSTRUMENT.

SPECIFICATION forming part of Letters Patent No. 480,888, dated August 16, 1892.

Application filed March 11, 1891. Serial No. 384,651. (No model.)

*To all whom it may concern:*

Be it known that I, EDWARD WESTON, of Newark, Essex county, New Jersey, have invented a new and useful Improvement in Electrical Measuring-Instruments, of which the following is a specification.

In United States Letters Patent No. 446,493, granted to me on the 17th day of February, 1891, I have described an electrical measuring-instrument embodying a coil supported in an annular magnetic field and free to move therein to take a new position dependent upon differences of potential between the terminals of the instrument. With said coil is combined an index mechanism between coil and index for causing the latter to show on a suitable scale the extent of movement of said coil.

My present invention consists in certain improvements which I have applied to an instrument of this class, and therefore exhibit them in such relation, although it is to be understood that they are not limited to this application only.

My said invention consists, first, in a new means of deadening or dampening the vibrations of the needle or index, and, second, in a simple device for securing the movable coil in rigid position for transportation.

In the accompanying drawings, Figure 1 is a front view of the magnet and suspended coil embodied in an instrument of the general type set forth in my patent aforesaid, showing the device for rigidly holding the coil and also the needle-dampening device in place, the said parts being shown in section on the line 1 1 of Fig. 2. Fig. 2 is a section on the line 2 2 of Fig. 1. Fig. 3 shows the mode of connection between one arm of the forked bracket and the coil of the supporting-cylinder. Fig. 4 is a similar section showing a modification in the form of the dampening-magnet which acts upon the needle.

Similar letters of reference indicate like parts.

I will first describe the parts here shown of the instrument to which my invention is applied and then refer specifically to the details.

F and H are the tubular pole-pieces of a permanent magnet, the pole-piece F being arranged within the pole-piece H, so that there is an annular space between them. This space is a strong magnetic field.

L is a cylinder of light metal or paper, which is supported upon the tube N, which extends through the tubular pole-piece F. The tube N is carried by two leaf-springs O and P.

Within the tube N and secured to the extremity thereof nearest the spring P is a spiral spring R, the free end of which is fastened to the short rod or shaft e. Said shaft is secured to a yoke T, which is supported by pivot-pins in the block W, which is carried by bracket a. The outer arm of the yoke T carries the index-needle V. The cylinder L carries a coil K, through which the current which controls the instrument passes, and by the reaction of the field produced by said passage of the current upon the annular field in which the cylinder L and its coil K are situated the coil, and consequently the cylinder, is caused to move bodily in an axial direction in said field and to assume a position therein dependent upon the difference of potential between the terminals of the instrument. The arrangement of the internal spring R, the yoke T, bracket a and block W, cylinder L, and coil K is the same as is illustrated in my prior patent before referred to, and therefore needs no further description. It will be observed that the bodily movement of the coil K is transmitted to the index-needle, so as to cause a vibratory motion thereof over its scale by means of the elastic spring R. In instruments of this kind where the movement of the coil is very small the index-needle is made of considerable length, so that a very slight movement of the coil will produce a large travel of the needle in arc. Slight oscillations of the spring R, due to its own elasticity, cause oscillations of the needle, and these are also further produced by the inertia of the needle itself in coming to rest. In order to check or dampen these oscillations, I avail myself of a specific adaptation of the invention broadly described and claimed by me in Letters Patent No. 446,489, dated February 17, 1891, and employ a body of diamagnetic material connected to the parts of which the motion is to be dampened or arrested, which diamagnetic body is caused by the movement of said parts to move transversely the lines of a field of force. This device consists in a disk $h$ of aluminium, which is supported on the shaft $e$, so as to rotate therewith. Said disk is received between the arms of a small permanent magnet $i$, which may be supported upon a bracket $j$, secured to the pole-piece H. The bracket $j$ is preferably made of non-magnetic material; or, instead of using a separate magnet $i$, I may use as a modification the device illustrated in Fig. 4, in which $i'$ is an arm of magnetic material connected to the pole-piece F, and $i''$ is another arm of magnetic material connected to the pole-piece H. The arm $i'$ is brought out through a hole $k$ in the head of cylinder L. The arms $i'$ and $i''$ are therefore continuations of the principal magnets of the instrument, and their polar extremities are located, as shown, on opposite sides the disk $h$.

As is well known and as is fully pointed out in my said patent, No. 446,489, the movement of a diamagnetic body when moved transversely the lines in a field of force is retarded, and in the present case such retardation is sufficient or may be adjusted so as to be sufficient to overcome the vibration of the needle (or of the needle and associated parts) due to inertia. Of course the retarding effect of the disk $h$ is also exerted in some measure upon the cylinder L.

It is to be understood that I do not limit myself to the precise arrangement of disk and controlling-magnet as here shown, because I may arrange a diamagnetic body to exercise the same control when arranged and supported in other ways.

In transporting an instrument the construction of which, in order to insure accuracy, is necessarily delicate it is desirable that the movable parts should not be left free, for in such case their movement under the shocks of careless handling might result in injury or displacement. I have therefore provided a simple contrivance for holding the cylinder L rigidly in place, which may remain at all times a part of the instrument and be put into use whenever desired. I provide a bracket $l$, which may be secured upon the outer face of the pole-piece H. Said bracket has two arms $m$, which extend down in front of the head of the coil K. Through the ends of these arms pass set-screws $n$, which are received in threaded openings in the cylinder-head. When the instrument is in use, the screws $n$ are moved out of the cylinder-head openings and the cylinder L is then free to vibrate. When the instrument is to be packed, the screws $n$ are moved into said openings, and thus rigidly hold the said cylinder. Passing through the back board A of the instrument is another set-screw $o$, which when set up bears against the closed extremity of the tube N, and, acting in the opposite direction to the screws $n$, aids in preventing displacement of the parts. This screw is also loosened when the instrument is put into use.

I claim—

1. In an electrical instrument, a movable index-arm, and a body of diamagnetic material in plate or disk form disposed transversely the lines of a field of force and connected to and operating to retard or oppose the oscillatory motion of said index.

2. In an electrical instrument, a movable conductor in coil or loop form, a shaft or arbor free to oscillate and turned by the motion of said conductor, and on said shaft an index-arm and a disk or plate of diamagnetic material disposed in a plane transversely the lines of a field of force, the said disk operating to retard the oscillatory movement of said index-arm.

3. In an electrical instrument, a conductor in coil or loop form bodily movable in an axial direction, and a body of diamagnetic material actuated by said conductor and disposed and moving transversely the lines of a field of force.

4. In an electrical instrument, a movable body, an index, an elastic or resilient transmitting device for conveying motion from said body to said index and disposed in a plane transversely the lines of a field of force, and a body of diamagnetic material connected to and operating to retard or oppose the motion of said index.

5. In an electrical instrument, the combination of the shaft $e$, index-arm V, disk $h$, of diamagnetic material, on said shaft $e$, and a magnet in the field of force, of which magnet said disk is disposed, substantially as described.

6. In an electrical instrument, the combination of the magnet H F, movable coil K, supported in the field of force of said magnet-shaft $e$, vibrated by said coil, index V, and disk $h$, of diamagnetic material, on said shaft $e$, and pole-pieces $i'$ $i''$ of said magnet H F disposed in inductive proximity to opposite sides of said disk $h$.

7. In an electrical instrument, the vibrating cylinder L, the fixed bracket $l$, and the set-screw $n$, supported by said bracket and constructed to enter a wall of said cylinder.

8. In an electrical instrument, the vibrating cylinder L, support N therefor, fixed bracket $l$, a set-screw $n$, supported by said bracket and bearing upon said cylinder L, and the set-screw $o$, bearing upon said support N, the said screws $n$ and $o$ operating to clamp and rigidly hold said cylinder.

EDWARD WESTON.

Witnesses:
R. C. FESSENDEN,
A. F. CONERY, Jr.